(12) United States Patent
Taggett (10) Patent No.: US 6,450,283 B1
(45) Date of Patent: Sep. 17, 2002

(54) WASTE HEAT CONVERSION SYSTEM

(76) Inventor: Michael Blake Taggett, P.O. Box 16350, Wichita, KS (US) 67216

( * ) Notice: Subject to any disclaimer, the term of this patent is extended or adjusted under 35 U.S.C. 154(b) by 0 days.

(21) Appl. No.: 09/723,433

(22) Filed: Nov. 27, 2000

(51) Int. Cl.$^7$ ................................................. B60K 3/00
(52) U.S. Cl. ........................................ 180/304; 60/618
(58) Field of Search .............................. 180/65.2, 65.3, 180/65.4, 65.8, 301, 302, 54.1, 303, 304; 60/618

(56) References Cited

U.S. PATENT DOCUMENTS

| | | | |
|---|---|---|---|
| 3,945,210 A | 3/1976 | Chapin | |
| 3,948,053 A | 4/1976 | Gamell | |
| 3,979,913 A | * 9/1976 | Yates ........................... | 60/618 |
| 4,031,705 A | 6/1977 | Berg | |
| 4,351,155 A | 9/1982 | Anderson et al. | |
| 4,366,674 A | 1/1983 | Eakman | |
| 4,394,582 A | * 7/1983 | Kreissl et al. ............... | 290/4 C |
| 4,470,476 A | 9/1984 | Hunt | |
| 4,756,377 A | * 7/1988 | Kawamura et al. .......... | 180/165 |
| 4,785,631 A | * 11/1988 | Striebich ...................... | 60/618 |
| 4,901,531 A | 2/1990 | Kubo et al. | |
| 4,996,845 A | 3/1991 | Kim | |
| 5,000,003 A | 3/1991 | Wicks | |
| 5,191,766 A | * 3/1993 | Vines ........................... | 60/619 |
| 5,327,979 A | 7/1994 | Du et al. | |
| 5,327,987 A | 7/1994 | Abdelmalek | |
| 5,339,632 A | 8/1994 | McGrabb et al. | |
| 5,385,211 A | * 1/1995 | Carroll ........................ | 180/65.2 |
| 5,875,633 A | 3/1999 | Lawson, Jr. | |
| 6,202,782 B1 | * 3/2001 | Hatanaka ..................... | 180/301 |
| 6,374,613 B1 | * 4/2002 | Filippone ................... | 60/618 X |

FOREIGN PATENT DOCUMENTS

| | | | |
|---|---|---|---|
| DE | 4428032 | * | 2/1996 |
| JP | 5839510 | * | 3/1983 |
| JP | 58220945 | * | 12/1983 |

OTHER PUBLICATIONS

Doyle et al., Installation of a Diesel–Organic Rankine Compound Engine in a Class 8 Truck for a Single Vehicle Test, Jun. 15, 1979, Society of Automotive Engineers Technical Paper Series, 790646, SAE, Warrendale, Pennsylvania.

* cited by examiner

Primary Examiner—Brian L. Johnson
Assistant Examiner—Bryan Fischmann
(74) Attorney, Agent, or Firm—Robert Blinn (57) ABSTRACT

The invention waste heat conversion system for a motor vehicle includes a waste heat converting vapor engine coupled by a one way clutch to a motor-generator which is coupled through an engageable clutch to the vehicle drive train. The motor-generator of the invention system is also electrically connected to a storage battery and can either charge the battery or be powered by the battery to provide added power to the drive train. The invention system is capable of numerous modes of operation and can also be configured to convert braking energy for storage in the battery.

18 Claims, 4 Drawing Sheets

WASTE HEAT CONVERSION SYSTEM

FIELD OF THE INVENTION

This invention relates to a system for converting waste heat from an internal combustion engine of a vehicle to provide additional power for the vehicle. More particularly, this invention relates to a vehicle waste heat conversion system including a vapor engine which is coupled to the drive train of the vehicle through a motor-generator where the motor-generator is connected to a battery which it can charge or from which it can draw power.

BACKGROUND OF THE INVENTION

Significant effort has been directed toward developing systems that use the energy present in the waste heat produced by internal combustion engines. The patent literature discloses several examples of proposed systems for recovering internal combustion engine waste heat. For example, U.S. Pat. No. 3,948,053 by Gamell describes a system that uses exhaust heat to generate vapor for powering a supercharger. Berg, in U.S. Pat. No. 4,031,705 describes a heat conversion system having a vapor engine that mechanically communicates with the crank shaft of an internal combustion engine via an one way clutch. The vapor engine of Berg's system is powered by a working fluid in a Rankine circuit that is heated by waste heat from the internal combustion engine coolant and then boiled by engine exhaust waste heat.

A heat conversion system described by Anderson and Nation in U.S. Pat. No. 4,351,155 uses two Rankine circuits having two distinct working fluids. One of the working fluids of the Anderson and Nation system is adapted for boiling at the relatively low temperature of the internal combustion engine liquid coolant. The other working fluid of the Anderson and Nation System boils at the higher temperature of the engine's exhaust. Hunt, in U.S. Pat. No. 4,470,476, describes hybrid vehicles having multiple power plants. The claims of Hunt's patent are directed at a system that generates electricity from engine exhaust waste heat using a thermoelectric device. The drive train of Hunt's system can be alternately or simultaneously powered by a primary internal combustion engine and an electric motor.

U.S. Pat. No. 4,901,531 issued to Kubo and Ghuman teaches a combination diesel/Rankine engine having a diesel portion with five diesel cylinders and one Rankine cylinder. The Rankine cylinder of Kubo and Ghuman's engine expands vapor that is generated in a boiler heated by the waste heat from the diesel portion of the engine. U.S. Pat. No. 5,327,987 issued to Abdelmalek teaches a vehicle having a waste heat powered vapor engine that turns an electric generator. Abdelmalek's vapor powered electric generator can charge a battery or drive an electric motor that is connected to a portion of the drive train of the vehicle. The electric battery of Abdelmalek's system can also power the drive motor when the vapor engine is not producing power.

The foregoing are examples of useful systems for recovering internal combustion engine waste heat. However, none of the above described systems mechanically link a vapor engine and a unit combining the functions of a motor and a generator and then mechanically connect the resulting power module with a vehicle drive train to augment drive train power between the vehicle transmission and the vehicle drive wheels.

SUMMARY OF THE INVENTION

The invention waste heat conversion system features a motor-generator that is directly coupled to a waste heat converting vapor engine and the drive train between a vehicle transmission and the vehicle drive wheels. The invention system is capable of numerous modes of operation including a mode for converting waste heat to mechanical power that can be added to the drive train, a mode for converting waste heat to electrical power for storage in a battery, a mode where battery power is used to add power to the drive train and a mode for converting braking energy for storage in a battery.

The invention system converts waste heat primarily from the internal combustion engine exhaust stream into useful work by directing hot exhaust gas through a boiler where high pressure working fluid is converted into high pressure vapor. The invention system uses the exhaust stream as a source of heat because the exhaust stream usually carries most of the waste heat of an internal combustion engine. An exhaust bypass valve diverts hot exhaust gas around the boiler when high pressure vapor is not needed. In the invention system, the vapor engine is mechanically coupled to the motor-generator by a one way clutch. The vapor engine includes a vapor engine bypass valve that controls the supply of vapor to the vapor engine. The one way clutch between the vapor engine and the motor-generator allows the vapor engine to turn the motor-generator but does not allow the motor-generator to turn the vapor engine. The motor-generator is directly coupled by an engageable clutch to a portion of the vehicle drive train between the vehicle transmission and the drive wheels. The motor-generator is connected to a battery through a voltage regulator. The voltage regulator can function in three modes: a first mode where current flows from the motor-generator to the battery to charge the battery, a second mode where current flows from the battery to the motor-generator to power the motor-generator, and a third, neutral mode where the motor-generator turns freely as no current passes between the motor-generator and the battery.

The invention system also includes a control module that receives signals from sensors and then sends signals to control the operations of the vapor engine bypass valve, the engageable clutch and the voltage regulator. The control module receives signals from a power setting sensor that responds to the internal combustion engine throttle setting, a drive shaft rotation sensor that detects drive shaft rotation which occurs when the vehicle is moving, a brake activation sensor that detects brake activation, a battery charge sensor that measures the degree of battery charge and a vapor pressure sensor that measures the pressure of vapor produced by the boiler. The control module responds to signals from these sensors and directs the operations of the vapor engine bypass valve, the exhaust gas bypass valve, the voltage regulator and the engageable clutch so that the system operates in one of at least four modes: (1) a first mode where the my engageable clutch is engaged and the vapor engine turns the motor-generator to provide power to the drive train, (2) a second mode where the clutch is disengaged and the voltage regulator is activated to transfer current from the motor-generator to charge the battery as the vapor engine turns the motor-generator, (3) a third mode where the clutch is engaged and the voltage regulator is activated so that the battery can power the motor-generator to provide additional power to the drive train, and (4) a fourth mode of operation where the motor-generator draws power from the drive train to charge the battery thereby providing regenerative braking. In addition to these basic modes, the invention system can also respond to a conditions where the battery is fully charged, no power is needed at the drive train and high pressure steam is being generated. In such a condition, the hot exhaust bypass valve is opened to divert hot exhaust around the boiler and the vapor engine bypass valve is opened to divert high pressure vapor around the vapor engine.

DETAILED DESCRIPTION OF THE INVENTION

Figure 1:
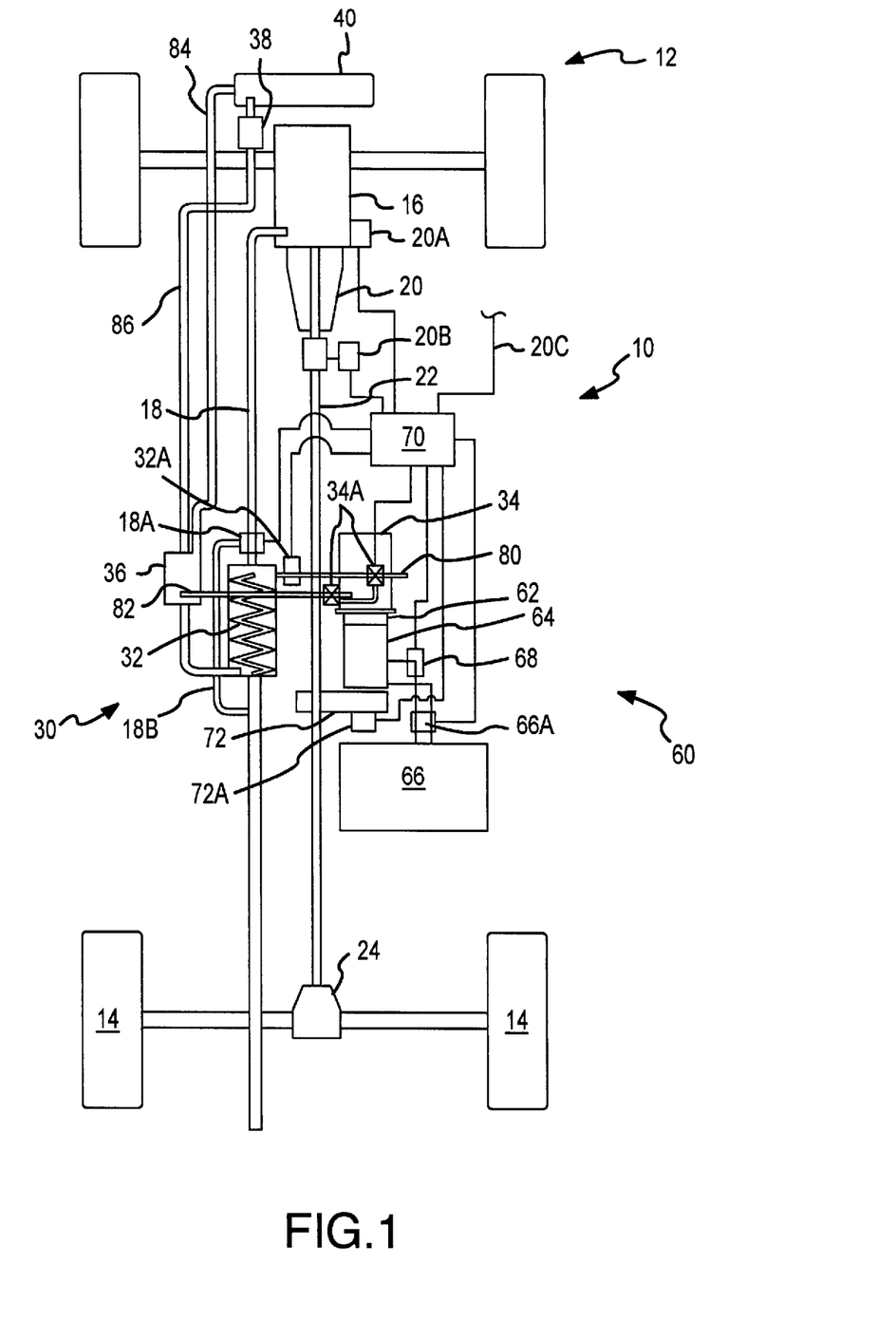
FIG. 1 is schematic diagram of the invention system.

Turning now to the drawings, wherein like reference numerals identify identical or corresponding elements, and more particularly to FIG. 1 thereof, a waste heat conversion system 10 is shown in combination with a vehicle 12. Vehicle 12 is driven by a pair of drive wheels 14 and is powered by an internal combustion engine 16 which produces power for a drive train including a transmission 20, a drive shaft 22 and a differential 24. Internal combustion engine 16 of vehicle 12 also produces hot exhaust gas that is transferred away from engine 16 by an exhaust pipe 18. Hot exhaust gas flowing in exhaust pipe 18 carries much of the waste heat produced by internal combustion engine 16.

As can be seen in FIG. 1, invention waste heat conversion system 10 interfaces with vehicle 12 at exhaust pipe 18 and drive shaft 22. System 10 includes a waste heat conversion subsystem 30 and a power management subsystem 60. Waste heat conversion subsystem 30 has a boiler 32, a vapor engine 34, a regenerator 36, a pump 38 and a condenser 40. Power management subsystem 60 includes a motor-generator 64, a battery 66, a voltage regulator 68 and a control module 70. Control module 70 receives signals from a set of sensors and responds to these signals by generating control signals for devices that control other components of the subsystem. The sensors of power management subsystem 60 that provide signals to control module 70 include a power setting sensor 20A, a drive shaft rotation sensor 20B, a brake activation sensor 20C, a vapor pressure sensor 32A and battery charge sensor 66A. Battery 66 and a motor-generator 64 are electrically connected through a voltage regulator 68 which can either draw power from battery 66 to run motor-generator 64 or draw power from motor-generator 64 to charge battery 66.

Power management subsystem 60 further includes a clutch 72, a vapor engine bypass valve 34A and an exhaust bypass valve 18A. Clutch 72 is situated between motor-generator 64 and drive shaft 22 and can therefore also be called a motor-generator drive shaft clutch and should not be confused with one-way clutch 62. Clutch 72 is controlled by a clutch controller 72A. Vapor engine bypass valve 34A, when activated, diverts high pressure vapor around vapor engine 34. Vapor engine bypass valve 34A can be selected or configured to partially or totally divert flow when activated. Exhaust bypass valve 18A, when activated, diverts exhaust gas into an exhaust bypass 19B which conveys exhaust gas around boiler 32. Control module 70 directs the operations of voltage regulator 68, clutch controller 72A, vapor engine bypass valve 34A and hot exhaust bypass valve 18A.

Waste heat conversion subsystem 30 uses a Rankine cycle to extract heat from the exhaust stream carried by exhaust pipe 18 by boiling a working fluid in boiler 32 at a relatively high pressure and then expanding the resulting vapor in vapor engine 34. The working fluid selected for the Rankine cycle of heat conversion subsystem 30 may be any suitable working fluid such as water or a hydrocarbon working fluid such as Fluorinol®. Boiler 32 is a heat exchanger that transfers heat from the exhaust stream of exhaust pipe 18 to the high pressure working fluid of waste heat conversion subsystem 30. High pressure vapor leaves boiler 32, is conveyed to vapor engine 34 via a high pressure vapor line 80 and then expands in vapor engine 34 to produce mechanical power by turning a shaft. Low pressure vapor leaving vapor engine 34 is conveyed by low pressure line 82 to regenerator 36 where it is cooled by low temperature, high pressure working fluid. The low pressure vapor exits regenerator 36 and flows to condenser 40 through condenser feed line 84. In condenser 40, the low pressure vapor is condensed at a relatively low temperature to a liquid state. Although not shown in FIG. 1, it is possible to preheat cold working fluid leaving condenser 40 in a heat exchanger with coolant from internal combustion engine 16, thereby capturing additional waste heat from engine 16. It would also be possible to channel the system working fluid directly through engine 16 after passing through condenser 40 for preheating prior to regenerator 36 and boiler 32. A feed pump 38 draws liquid working fluid from condenser 40, elevates it to a high pressure and pumps it through a boiler feed line 86 toward boiler 32. The high pressure working fluid in boiler feed line 86 is first heated in regenerator 36 by low pressure vapor which is cooled as described above and then enters boiler 32 where it boils as described above. Vapor engine 34 is preferably a positive displacement rotary engine that can operate at a wide range of speeds. Vapor engine 34 is preferably a positive displacement rotary engine that can operate over a wide range of speeds as it turns a vapor engine shaft (not shown). For example, vapor engine 34 may have a high pressure stage and a low pressure stage so that most of the energy of the working fluid in the high pressure vapor state can be extracted to produce mechanical energy. An example of a multi-stage positive displacement rotary engine that would be suitable for vapor engine 34 is described in U.S. Pat. No. 6,142,758 for A Rotary Positive Displacement Engine issued to the inventor on Nov. 7, 2000.

Power management subsystem 60 manages the use and storage of the mechanical energy produced by vapor engine 34. A one way clutch 62 allows vapor engine 34 to turn motor-generator 64 but does not allow motor-generator 64 to turn vapor engine 34. Voltage regulator 68, battery 66, control module 70 and clutch 72 make it possible for motor-generator 64 to function in four modes. In the first mode of operation, motor-generator 64 can turn freely while power from vapor engine 34 passes on to engaged clutch 72 and into drive shaft 22. When motor-generator 64 is in the first, free turning mode, control module 70 engages clutch 72 and opens circuits communicating between motor-generator 62 so that no current passes between motor-generator 62 and battery 66. In this mode, waste heat is converted to help drive vehicle 12. In the second mode of operation, the clutch of clutch 72 is engaged and voltage regulator 68 opens a circuit between battery 66 and motor-generator 64 to convey power from battery 66 to motor-generator 64. In this second mode, motor-generator 64 acts as an electric motor to provide power to drive shaft 22. When in the second mode, motor-generator 64 may also have a power input from vapor engine 34 in which case, vapor engine 34 and motor-generator 64 will work in unison to provide power to drive shaft 22. In this mode, stored energy in battery 66 is used to help move the vehicle. In the third mode of operation, clutch 72 is disengaged and voltage regulator 68 closes the connection between motor-generator 64 and discharged battery 66 which applies a load to motor-generator 64 as it is turned by vapor engine 34. In the third mode, vapor engine 34 turns motor-generator 64 as motor-generator 64 functions as a generator to charge battery 66. In this mode, waste heat is converted and stored in battery 66 so that it can be used later to power vehicle 12. The fourth mode of operation is a regenerative braking mode. In this fourth mode, when the vehicle brake is activated, when vehicle drive shaft 22 is turning, that is, when vehicle 12 is moving, and when battery 66 is not fully charged, control module 70, will engage clutch 72 so that drive shaft 22 can turn motor-generator 64. Motor-generator 64 applies mechanical resistance to drive shaft 22 as it generates electricity for charging battery 66, thereby providing regenerative braking. These four modes of operation give system 10 a very high degree of flexibility to respond to various vehicle operating conditions.

Although power management subsystem 60 preferably uses battery 66 to store excess energy produced by motor-generator 64, any of a number of energy storage means could be selected. A system using pressurized air or a system using a bank of capacitors or even a system using a flywheel could provide an energy storage means for storing the excess energy produced by invention system 10.

Power management subsystem 60 obtains signal inputs and responds to those inputs by controlling the operations of clutch controller 72A, voltage regulator 68, vapor bypass valve 34A and exhaust bypass valve 18A. In the embodiment shown in FIG. 1, control module 70 can receive signals from at least five sources: a power setting sensor 20A, a drive shaft rotation 'sensor 20B, a brake activation sensor 20C, a vapor pressure sensor 32A and a battery charge sensor 66A. Power setting sensor 20A produces a signal in response to the throttle setting of engine 16. When the throttle setting of engine 16 is greater than zero, power setting sensor 20A generates a corresponding, positive signal. Drive shaft rotation sensor 20B may, for example, be designed to produce a signal of one (1) when drive shaft 22 is rotating and a signal of zero (0) when it is not. Brake activation sensor 20C may for example produce a signal of one (1) when the brake is activated and a signal of zero (0) when it is not. Vapor pressure sensor 32A produces a signal in response to the pressure in vapor engine feed line 80. Battery charge sensor 66A generates a signal in response to the voltage drop across the terminals of battery 66.

Control module 70 receives and responds to the various sensor signals by generating four control signals, a clutch control signal for operating clutch controller 72A, a voltage regulator signal for controlling the operation of voltage regulator 68, a vapor flow control signal for controlling vapor engine bypass valve 34A and an exhaust gas control signal for controlling exhaust gas bypass valve 18A. Clutch controller 72A either engages or disengages clutch 72. Voltage regulator 68 controls the flow of current between motor-generator 64 and battery 66. Vapor engine bypass valve 34A either diverts high pressure vapor from boiler 32 back to regenerator 36 or supplies vapor engine 34 with high pressure vapor from boiler 32.

Figure 2:
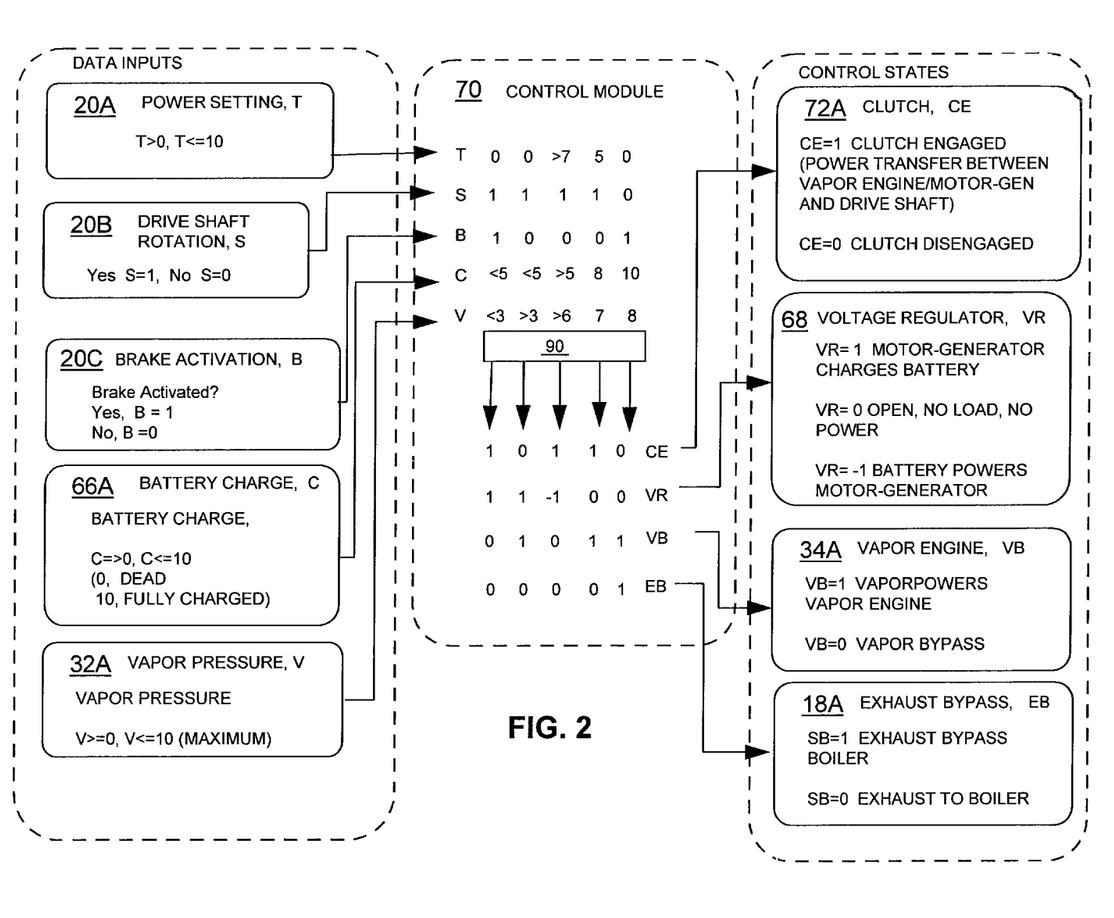
FIG. 2 is a schematic of the logic controlling the operation of the invention system.

FIG. 2 provides a schematic diagram that illustrates the operations of control module 70. As can be seen in FIG. 2, control module 70 receives power setting signal T from power setting sensor 20A, a drive shaft rotation signal S, from drive shaft rotation sensor 20B, a brake activation signal B from brake activation sensor 20C, battery charge signal C from battery charge sensor 66A and vapor pressure signal V from vapor pressure sensor 32A. Control module 70 responds to these sensor signals by executing an algorithm 90 that processes the sensor signals to generate sets of control signals. In a first example shown in FIG. 2, when T, which is the throttle setting of engine 16, is zero, when S is one indicating that drive shaft 22 is rotating, when B is one, indicating that the brake is activated, when C is less than 5, indicating that battery 66 is less than half charged and when V is less than 3, indicating that vapor pressure is low, then, control module 70 produces a clutch control state signal, CE of 1, a voltage regulator control state signal, VR of 1, a vapor bypass control state signal, VB of 0 and an exhaust bypass signal, EB of 0. As can be seen in FIG. 2, these five signals cause clutch 72 to engage, battery 66 to be connected to motor-generator 64, vapor engine bypass valve 34A to open to prevent vapor engine 34 from operating and exhaust bypass valve 18A to close causing hot exhaust gas to continue flowing through boiler 32. With clutch 72 engaged, shaft 22 turns motor-generator 64 which charges battery 66 thereby providing regenerative braking to vehicle 12. Hot exhaust gas continues to flow past exhaust bypass valve 18A and through boiler 32 because braking is a temporary condition and the system may soon have a need for high pressure vapor.

By way of a second example shown in FIG. 2, when T, which is the throttle setting of engine 16 is zero, when S is one, indicating that drive shaft 22 is rotating, when B is zero, indicating that the brake is not activated, when C is less than 5, indicating that battery 66 is less than half charged, and when V is greater than 3, indicating that vapor pressure is at least moderate, then, control module 70 produces a clutch control state signal, CE of 0, a voltage regulator control state signal, VR of 1, a vapor bypass control state signal, VB of 1 and an exhaust bypass signal, EB of 0. As can be seen in FIG. 2, these five signals cause clutch 72 to disengage, battery 66 to be connected to motor-generator 64, vapor engine bypass valve 34A to close to cause vapor engine 34 to operate and exhaust bypass valve 18A to remain closed sending hot exhaust to boiler 32. With clutch 72 disengaged, vapor engine 34 only turns motor-generator 64 which charges battery 66 thereby storing converted waste heat energy for later use by vehicle 12.

In a third example shown in FIG. 2, when T, which is the throttle setting of engine 16 is greater than 7, indicating a high demand for power, when S is one, indicating that drive shaft 22 is rotating, when B is zero, indicating that the brake is not activated, when C is greater than 5, indicating that battery 66 is more than half charged, and when V is greater than 6, indicating that vapor pressure is moderately high, then, control module 70 produces a clutch control state signal, CE of 1, a voltage regulator control state signal, VR of−1, a vapor bypass control state signal, VB of 1 and an exhaust bypass control signal, EB of 0. As can be seen in FIG. 2, these five signals cause clutch 72 to engage, battery 66 to be connected to motor-generator 64 so that power transfers from battery 66 to motor-generator 64, vapor engine bypass valve 34A to close to cause vapor engine 34 to operate and exhaust bypass valve 18A to close causing hot exhaust gas to continue flowing through boiler 32. With clutch 72 engaged, vapor engine 34 turns motor-generator 64, while motor-generator 64 is also powered by battery 66. In this mode, motor generator 64 and vapor engine 34 work together to provide significant additional power to drive shaft 22.

In a fourth example shown in FIG. 2, vehicle 12 is in a steady state cruising condition. With this set of conditions, T which is the throttle setting of engine 16 is 5, indicating a moderate demand for power, S is one indicating that drive shaft 22 is rotating, B is zero indicating that the brake is not activated, C is 8 indicating that battery 66 is well charged and V is 7, indicating that vapor pressure is moderately high. With these conditions, control module 70 produces a clutch control state signal, CE of 1, a voltage regulator control state signal, VR of 0, a vapor bypass control state signal, VB of 1 and an exhaust bypass signal, EB of 0. As can be seen in FIG. 2, these five signals cause clutch 72 to engage, battery 66 to be disconnected from motor-generator 64, exhaust bypass valve 18A to close so that hot exhaust gas goes to boiler 32 and vapor engine bypass valve 34A to close so that high pressure vapor goes to vapor engine 34. With clutch 72 engaged, vapor engine 34 turns motor-generator 64 as it turns freely and passes power through engaged clutch 72 to drive shaft 22. In this fourth example vapor engine 34 converts waste heat to provide additional power to drive shaft 22. In the mode of this fourth example, the load on engine 16 is reduced and its throttle setting gradually decreases as engine 16 produces less hot exhaust gas. Accordingly, in this mode of operation, the system converges on a steady state or equilibrium condition where engine 16 burns less fuel, produces less waste heat as a good part of that waste heat is converted into to work that is added to the drive train of vehicle 12.

In a fifth example shown in FIG. 2, vehicle 12 is stopped but engine 16 is still producing significant amounts of waste heat. With this set of conditions, T which is the throttle setting of engine 16 is 0, indicating no demand for power, S is zero indicating that drive shaft 22 is not rotating, B is 1 indicating that the brake is activated, C is 10 indicating that battery 66 is fully charged and V is 8, indicating that vapor pressure is moderately high. With these conditions, control module 70 produces a clutch control state signal, CE of 0, a voltage regulator control state signal, VR of 0, a vapor bypass control state signal, VB of 1 and an exhaust bypass signal, EB of 1. As can be seen in FIG. 2, these five signals cause clutch 72 to disengage, battery 66 to be disconnected from motor-generator 64, vapor engine bypass valve 34A to open to cause vapor engine 34 to not operate and exhaust bypass valve 18A to open to divert hot exhaust gas around boiler 32. With vapor engine bypass valve 34A and exhaust bypass valve 18A open, boiler 32 and vapor engine 34 cease operating.

As can be readily appreciated by those skilled in the art, algorithm 90 can be designed to respond to signal inputs and produce control signals in a multitude of ways. Further, control signals that control the operation of the exhaust gas bypass valve 18A, vapor engine bypass valve 34A and voltage regulator 68 do not have to be simple on or off signals. A gradually increasing or varying power input to drive shaft 22 could be achieved by control signals having a range of values. In this way, smooth transitions between power states could be accomplished. With variable response modes, control module 70 could respond to a range of power settings, various ranges of battery states and ranges of vapor pressure. As can be seen by the forgoing descriptions of the possible modes of function of system 10, system 10 can be adapted to operate in a great number of ways to provide a large number of functions that can respond to many different operating conditions.

Figure 3:
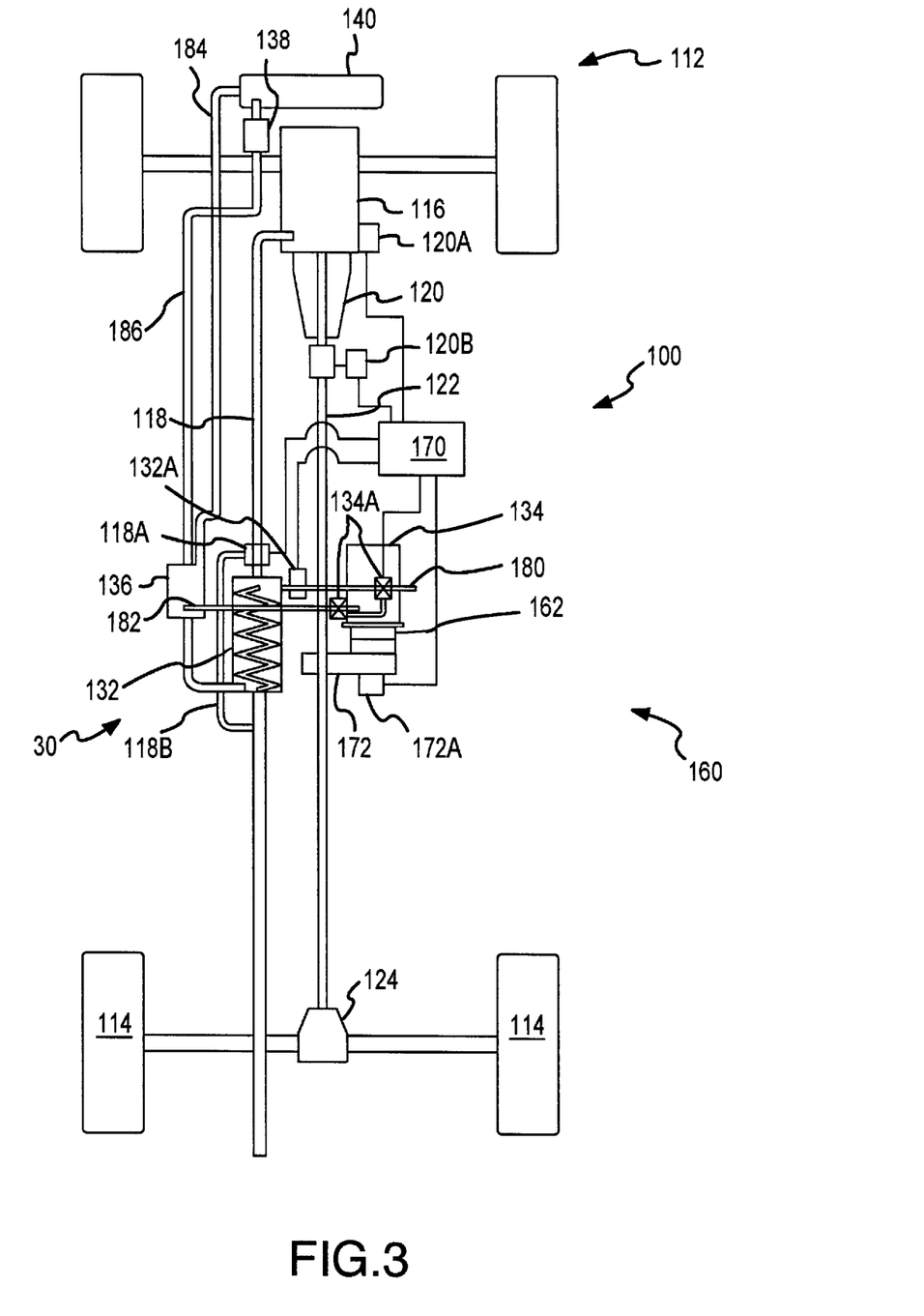
FIG. 3 is schematic diagram of a second embodiment of the invention system.

FIG. 3 illustrates system 100 which is a second embodiment of the invention system which has no electrical generation or storage capability. Invention system 100 is incorporated into a vehicle 112 which like vehicle 12 shown in FIG. 1, includes an engine 116, a transmission 120, a drive shaft 122, a differential 124, drive wheels 114 and exhaust pipe 118. As can be seen in FIG. 3, invention system 100 functionally interacts with vehicle 112 at exhaust pipe 118 and drive shaft 122. System 100 includes a waste heat conversion subsystem 130 and a power management subsystem 160. Waste heat conversion subsystem 130 includes a boiler 132, a vapor engine 134, a regenerator 136, a pump 138 and a condenser 140. Power management subsystem 160 includes a control module 170 that receives signals from a power setting sensor 120A, a drive shaft rotation sensor 120B and a vapor pressure sensor 132A. Control module 170 sends control signals to a clutch controller 172A that controls a clutch 172, a vapor engine bypass valve 134A that controls the operation of vapor engine 134 and an exhaust bypass valve 118A that controls the flow of hot exhaust gas to or around boiler 132.

As with system 10 in FIG. 1, in system 100 of FIG. 3, waste heat conversion subsystem 130 of system 100 employs a Rankine cycle to convert heat from the exhaust stream carried by exhaust pipe 118 by boiling a working fluid in boiler 132 at a relatively high pressure and then expanding the resulting vapor in vapor engine 134. As with system 10 shown in FIG. 1, in system 100 in FIG. 3 an exhaust bypass valve 118A and an exhaust bypass 118B is used to divert hot exhaust gas around boiler 132. When hot exhaust is not being diverted around boiler 132, high pressure vapor leaves boiler 132, is conveyed to vapor engine 134 via a high pressure vapor line 180 and then expands in vapor engine 134 to produce mechanical power by turning a shaft. As with system 10 of FIG. 1, low pressure vapor leaving vapor engine 134 is conveyed by a low pressure line 182 to a regenerator 136 where it is cooled by low temperature, high pressure working fluid. The low pressure vapor exits regenerator 136 and flows to condenser 140 through a condenser feed line 184. In condenser 140, the low pressure vapor is condensed at a relatively low temperature and a relatively low pressure to a liquid state. A feed pump 138 draws liquid working fluid from condenser 140, elevates it to a high pressure and pumps it through a boiler feed line 186 toward boiler 132. The high pressure working fluid in boiler feed line 186 is first heated in regenerator 136 by low pressure vapor which is cooled as described above and then enters boiler 132 where it boils as described above.

Power management subsystem 160 manages the use of the mechanical energy produced by vapor engine 134. A one way clutch 162 allows vapor engine 134 to transfer power to engageable clutch 172 and drive shaft 122 but does not allow power to transfer from drive shaft 122 through engageable clutch 172 to turn vapor engine 134. At a minimum, at least one engageable clutch such as clutch 172 must be placed between vapor engine 134 and drive shaft 122. Under certain operating conditions such as when vehicle 112 is stopped, it must be possible to disengage vapor engine 134 from drive shaft 122 by disengaging a clutch.

As noted above, control module 170 of power management subsystem 160 can receive signals from three sources: a power setting sensor 120A, a drive shaft rotation sensor 120B and a vapor pressure sensor 132A. Power setting sensor 120A gives a zero signal if the throttle setting of engine 116 is at zero. When shaft 122 is turning, drive shaft rotation sensor 120B generates a corresponding, positive signal or a signal of one. Vapor pressure sensor 132A produces a signal in response to the pressure in vapor engine feed line 180. Control module 170 receives and responds to the signals produced by power setting sensor 120A, drive shaft rotation sensor 120B and vapor pressure sensor 132A by generating two control signals, a clutch control signal for operating a clutch controller 172A and a vapor flow control signal for controlling a vapor engine bypass valve 134A. Clutch controller 172A either engages or disengages clutch 172. Vapor engine bypass valve 134A either diverts high pressure vapor from boiler 132 back to regenerator 136 or supplies vapor engine 134 with high pressure vapor from boiler 132.

Figure 4:
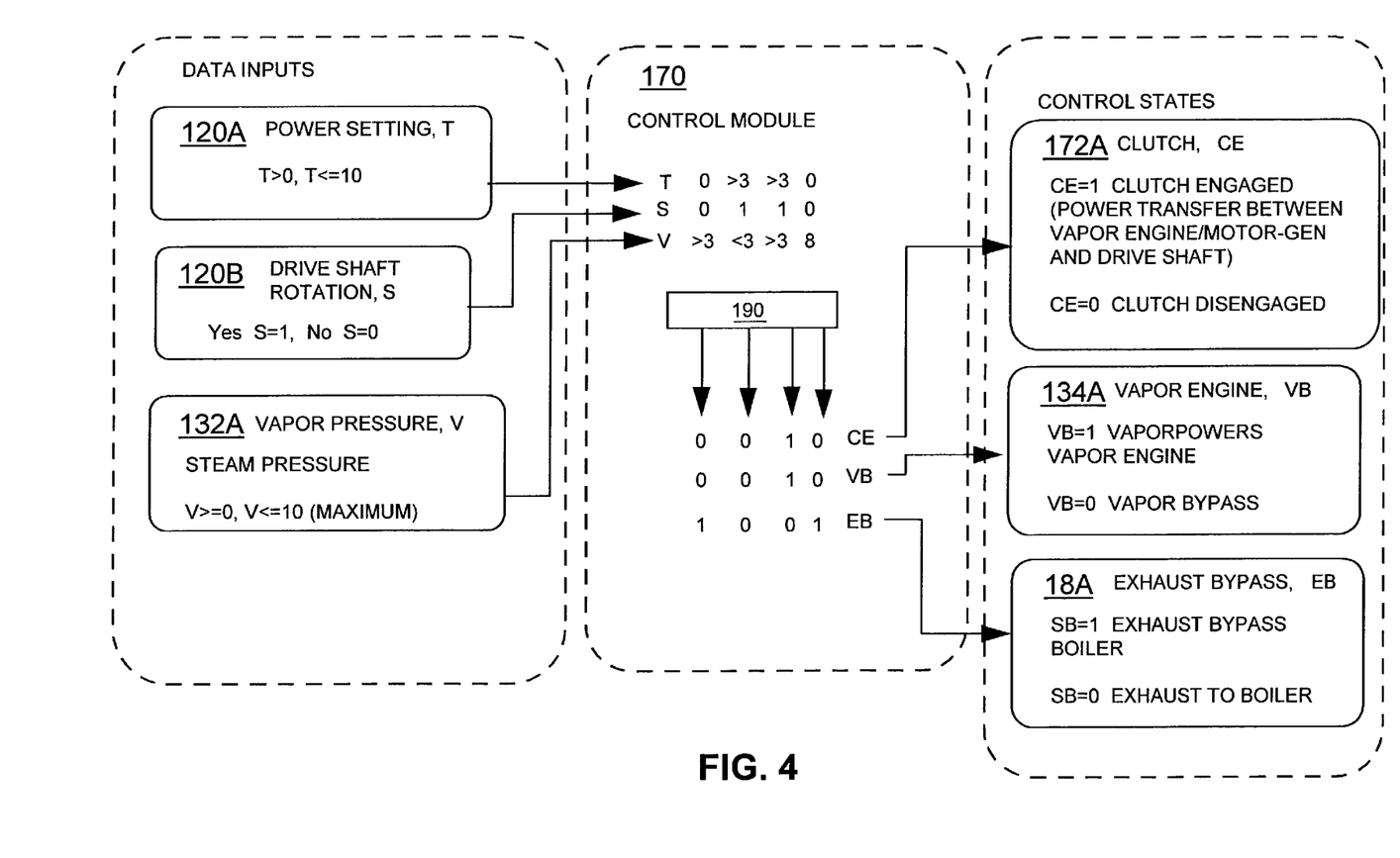
FIG. 4 is a schematic of the logic controlling the operation of the system of the second embodiment.

FIG. 4 provides a schematic diagram that illustrates the operations of control module 170. As can be seen in FIG. 4, control module 170 receives throttle setting signal T from power setting sensor 120A, a shaft rotation indication S from drive shaft rotation sensor 120B and vapor pressure signal V from vapor pressure sensor 132A. Control module 170 responds to these inputs by executing an algorithm 190 that processes the signal inputs to generate sets of control signals. In FIG. 4, when T is zero, indicating no demand for power, when S is 1, indicating that the drive shaft is rotating and when V is greater than 3 indicating that vapor is available, control module 170 produces a clutch control state signal, CE of 0, a vapor bypass control state signal, VB of 0 and an exhaust bypass signal, EB of 0. As can be seen in FIG. 4, these signals cause clutch 172 to disengage, vapor engine bypass valve 134A to open to prevent vapor engine 134 from operating and exhaust bypass valve 118A to open to divert hot exhaust gas around boiler 132 to stop the generation of vapor. In a similar fashion when T is greater than 3 indicating a significant demand for drive power, when S is one, indicating that shaft 122 is rotating and when V is greater than 3 indicating that useful vapor pressure is available, control module 170 produces signals CE=1, VB=1, and EB=0, that cause clutch 172 to be engaged, hot exhaust gas to flow to boiler 132 and vapor to flow to vapor engine 134 so that drive shaft 122 is also powered by vapor engine 134. A third state is illustrated in FIG. 4 in which T is greater than 3 indicating a substantial demand for drive power while S is one, indicating that drive shaft 122 is rotating, yet V is less than 3 indicating low vapor pressure. With T greater than 3 but V less than 3, module 170 produces a CE=0 and a VB=0 signal that cause vapor engine 134 to be bypassed and clutch 172 to disengage while an EB=0 signal causes hot exhaust gas to continue flowing to boiler 132. In a fourth example illustrated in FIG. 4, the throttle setting, T is 0, drive shaft rotation, S is 0, yet vapor pressure V is 8 indicating high vapor pressure. In response to these conditions, control module 170 produces a CE signal of 0, a VB signal of 0 and an EB signal of 1. These signals cause clutch 172 to disengage, vapor to bypass vapor engine 134 and hot exhaust gas to bypass boiler 132. In this fourth example, system 100 shuts down until additional power is needed.

As can be readily appreciated by those skilled in the art, algorithm 190 can be designed to respond to signal inputs and produce control signals in any of a multitude of ways. Further, as with system 10, signals that control vapor engine bypass valve 134A and exhaust gas bypass 118A do not have to be simple on or off signals. A gradually increasing or varying power input to drive shaft 122 could be achieved by control signals having ranges of values. In this way, smooth transitions between power states could be accomplished. With variable response modes, control module 170 could respond to a range of power settings, various ranges of vapor power availability to respond to many different operating conditions.

System 100 may also be practiced with a very simplified control system. With a simplified control system, only under cruise conditions would vapor and exhaust bypasses be closed causing hot exhaust gas to go to boiler 132-and high pressure vapor to go to vapor engine 134 while clutch 172 is engaged to allow the transfer of power from vapor engine 134 to drive shaft 122. The operator of a vehicle equipped with such a simplified system, or a cruise control system of such a vehicle, would sense a decrease in demand for power and would reduce the throttle setting accordingly as greater fuel efficiency is realized under cruise conditions. Such a simple system would be particularly useful for and could be easily added to vehicles that operate for extended periods of time under cruise conditions.

Both system 10 and system 100 are highly flexible systems capable of many modes of operation. The inventor estimates that significant increases in vehicle efficiency on the order of twenty to thirty percent can be realized by the addition of system 100. Yet, the addition of a waste heat conversion system such s as system 10 or system 100 to a motor vehicle would not significantly impact the basic configuration or operation of the motor vehicle.

The invention has been described above in considerable detail in order to comply with the patent laws by providing a full public disclosure of at least one of its embodiments. However, such a detailed description is not intended in any way to limit the broad features or principles of the invention, or the scope of patent monopoly to be granted. The skilled reader, in view of this specification may envision numerous modifications and variations of the above disclosed preferred embodiment. Accordingly, the reader should understand that these modifications and variations, and the equivalents thereof, are within the spirit and scope of this invention as defined in the following claims, wherein I claim:

What is claimed is:

1. A waste heat conversion system for producing added useful work in a vehicle of the type that is powered by a waste heat producing primary heat engine, where the primary heat engine is controlled by a throttle operable within a range of throttle settings between zero power and full power, where the primary heat engine is coupled through a transmission to a vehicle drive shaft and where the vehicle drive shaft is also coupled to vehicle drive wheels, the waste heat conversion system comprising:

(a) a boiler and a vapor engine, the boiler using waste heat produced by the primary heat engine to boil a pressurized working fluid to generate high pressure vapor, the vapor engine for receiving and expanding the high pressure vapor from the boiler to produce work, (b) a clutch coupling the vapor engine with the vehicle drive shaft, (c) a control unit, a drive shaft rotation sensor that sends a signal to the control unit in response to the rotation of the vehicle drive shaft and a power setting sensor that sends a signal to the control unit in response to the throttle setting of the primary heat engine, the control unit engaging the clutch when the vehicle drive shaft is rotating and when the throttle setting is greater than zero so that the system may operate in one of at least two modes: a first mode where the clutch is engaged so that power can transfer from the vapor engine to the vehicle drive shaft and a second mode where the clutch is not engaged so that power can not be transferred between the vapor engine and the vehicle drive shaft.

2. The system of claim 1 wherein, the clutch is a one-way clutch so that the vapor engine can turn the vehicle drive shaft but the vehicle drive shaft can not turn the vapor engine.

3. The system of claim, 1 wherein, the vapor engine includes a vapor engine bypass valve that can direct high pressure vapor generated by the boiler toward the vapor engine or that can direct high pressure vapor generated by the boiler away from the vapor engine and wherein a vapor pressure sensor sends a signal to the control unit in response to the pressure of the vapor generated by the boiler, the control unit activating the vapor engine bypass valve to direct high pressure vapor away from the vapor engine when the vehicle drive shaft is not rotating or when the throttle setting is zero, the control unit engaging the clutch and activating the vapor engine bypass valve to direct high pressure vapor toward the vapor engine when the vehicle drive shaft is rotating, the throttle setting is greater than zero and the vapor pressure is above a predetermined level.

4. The system of claim 1 wherein, the boiler is heated by the exhaust of the primary heat engine.

5. The system of claim 1 wherein, the boiler is heated by the exhaust of the primary heat engine and the boiler includes an exhaust bypass valve for diverting exhaust from the primary heat engine away from the boiler.

6. The system of claim 1 further comprising, a vapor engine bypass valve for controlling the amount of vapor delivered to the vapor engine from the boiler.

7. The system of claim 1 further comprising, a vapor engine bypass valve that can direct high pressure vapor generated by the boiler toward the vapor engine or that can direct high pressure vapor generated by the boiler away from the vapor engine.

8. The system of claim, 1 wherein, the boiler is heated by the exhaust of the primary heat engine and wherein the system further comprises a means for preheating the working fluid before the working fluid enters the boiler where such preheating of the working fluid is accomplished with waste heat produced by the primary heat engine other than the waste heat that is in the exhaust of the primary heat engine.

9. The system of claim 1 wherein, the vapor engine includes a vapor engine bypass valve that, when activated, can direct high pressure vapor generated by the boiler away from the vapor engine, wherein, the clutch coupling the vapor engine with the vehicle drive shaft is a one-way clutch which is not controlled by the control unit but which automatically engages so that the vapor engine can turn the vehicle drive shaft but the vehicle drive shaft can not turn the vapor engine, and wherein the control unit is coupled to a drive shaft rotation sensor, a power setting sensor and a brake activation sensor for sensing the activation of a brake, the control unit adapted to activate the vapor engine bypass valve if the vehicle drive shaft rotation sensor indicates that the vehicle drive shaft is not rotating, therefore indicating that the vehicle is not moving or if the throttle setting sensor indicates that the throttle setting is zero or if the brake activation sensor indicates that a brake is activated so that the system may operate in one of at least two modes: a first mode in which the vapor engine bypass valve is not activated, the vapor engine is powered by high pressure vapor and the vapor engine transfers power to the vehicle drive shaft through the one-way clutch when the vehicle is in motion and the throttle setting is greater than zero and a vehicle brake is not activated, and, a second mode in which the vapor engine bypass valve is activated, the vapor engine is not powered by high pressure vapor and the vapor engine does not transfer power to the vehicle drive shaft through the one-way clutch when the vehicle is not in motion or the throttle setting is zero or a vehicle brake is activated.

10. A waste heat conversion system for producing added useful work in a vehicle of the type that is powered by a waste heat producing primary heat engine, where the primary heat engine is controlled by a throttle operable within a range of power settings between zero power and full power, where the primary heat engine is coupled to a vehicle drive shaft through a transmission and where the vehicle drive shaft is also coupled to vehicle drive wheels, the waste heat conversion system comprising:

(a) a boiler and a vapor engine, the boiler using waste heat produced by the primary heat engine to boil a pressurized working fluid to generate high pressure vapor, the vapor engine for receiving the high pressure vapor from the boiler and expanding it to produce work by turning a shaft, (b) a power management subsystem that includes a motor-generator and an energy storage means, the motor-generator mechanically coupled to the vapor engine shaft through a one way clutch that allows the vapor engine to turn the motor-generator but which does not allow the motor-generator to turn the vapor engine, the motor-generator mechanically coupled to the vehicle drive shaft through a motor-generator drive shaft clutch, the motor-generator electrically coupled to the energy storage means, (c) a control subsystem for managing the transfer of energy between the primary heat engine, the vehicle drive shaft, the vapor engine, the motor-generator and the energy storage means, including, (i) a voltage regulator that controls the flow of electric current between the motor generator and the energy storage means, (ii) a control unit for controlling the voltage regulator and for engaging and disengaging the motor-generator drive shaft clutch so that the system may operate in one of at least three modes: a first mode where the motor-generator drive shaft clutch is engaged to transfer power from the vapor engine through the motor-generator to the vehicle drive shaft, a second mode where the motor-generator drive shaft clutch is engaged and the voltage regulator is activated to transfer an electric current from the energy storage means to the motor-generator so that the energy storage means can provide power to the motor-generator as the motor-generator provides power to the vehicle drive shaft and a third mode where the motor-generator drive shaft clutch is not engaged and the voltage regulator is activated to transfer an electric current from the motor-generator to the energy storage means as the motor-generator produces electricity as it is turned by the vapor engine.

11. The system of claim 10 wherein, the energy storage means is a battery.

12. The system of claim 10 wherein, the energy storage means is a battery and wherein the control unit is also coupled to sensors which include a battery charge sensor that sends a signal to the control unit in response to the level of charge of the battery, a drive shaft rotation sensor that sends a signal to the control unit in response to the rotation of the vehicle drive shaft and a power setting sensor that sends a signal to the control unit in response to the primary heat engine throttle setting, the control unit adapted to cause the motor-generator drive shaft clutch to engage when the vehicle drive shaft is rotating and the throttle setting is greater than zero, the control unit adapted to activate the voltage regulator to transfer power from the motor-generator to the battery when level of charge of the battery is below a predetermined level and the control unit adapted to activate the voltage regulator to transfer power from the battery to the motor-generator when level of charge of the battery is above a predetermined level.

13. The system of claim 10 wherein, the boiler is heated by the exhaust of the primary heat engine.

14. The system of claim 10 wherein, the boiler that is heated by the exhaust of the primary heat engine and the boiler further includes an exhaust bypass valve that can direct exhaust from the primary heat engine away from the boiler.

15. The system of claim 10 wherein, the boiler is heated by the exhaust of the primary heat engine, wherein the boiler further includes an exhaust bypass valve that can direct exhaust from the primary heat engine away from the boiler, and, wherein the system further comprises a means for preheating the working fluid before the working fluid enters the boiler where such preheating of the working fluid is accomplished with waste heat produced by the primary heat engine other than the waste heat that is in the exhaust of the primary heat engine.

16. The system of claim 10 wherein, the energy storage means is a battery, wherein the vapor engine further comprises a vapor bypass valve for redirecting high pressure vapor around the vapor engine, and, wherein the control unit is coupled to sensors which include a battery charge sensor that sends a signal to the control unit in response to the level of charge of the battery, a drive shaft rotation sensor that sends a signal to the control unit in response to the rotation of the vehicle drive shaft, a power setting sensor that sends a signal to the control unit in response to the throttle setting of the primary heat engine and a vapor pressure sensor that sends a signal to the control unit in response to vapor pressure, the control unit adapted to activate the vapor bypass valve to redirect high pressure vapor around the vapor engine when the vehicle drive shaft is not rotating or the throttle setting is zero and the level of charge of the battery is above a predetermined level, the control unit adapted to engage the motor-generator drive shaft clutch when the vehicle drive shaft is rotating, the throttle setting is greater than zero and the vapor pressure is above a predetermined level, the control unit adapted to activate the voltage regulator to transfer power from the motor-generator to the battery when the level of charge of the battery is below a predetermined level and the control unit adapted to activate the voltage regulator to transfer power from the battery to the motor-generator when the level of charge of the battery is above a predetermined level, the vehicle drive shaft is rotating and the throttle setting is greater than zero.

17. The system of claim 10 wherein, the energy storage means is a battery, wherein the vapor engine further comprises a vapor bypass arrangement for redirecting high pressure vapor around the vapor engine, wherein the boiler is heated by exhaust gas, wherein the boiler includes an exhaust bypass valve for diverting exhaust gas around the boiler, and, wherein the control unit is coupled with sensors which include a battery charge sensor that sends a signal to the control unit in response to the level of charge of the battery, a drive shaft rotation sensor that sends a signal to the control unit in response to the rotation of the vehicle drive shaft, a power setting sensor that sends a signal to the control unit in response the throttle setting of the primary heat engine, a vapor pressure sensor that sends a signal to the control unit in response to vapor pressure and a brake activation sensor that sends a signal to the control unit if a brake is activated, the control unit activating the vapor bypass when the vehicle drive shaft is not rotating or the throttle setting is zero and the level of charge of the battery is above a predetermined level, the control unit activating the exhaust bypass valve to divert exhaust around the boiler when the level of charge of the battery charge is above a predetermined level and the brake is activated or the vehicle drive shaft is not rotating, the control unit engaging the motor-generator drive shaft clutch when the vehicle drive shaft is rotating, the throttle setting is greater than zero and the vapor pressure is above a predetermined level, the control unit activating the voltage regulator to transfer power from the motor-generator to the battery when the level of charge of the battery is below a predetermined level and the control unit activating the voltage regulator to transfer power from the battery to the motor-generator when the level of charge of the battery is above a predetermined level, the vehicle drive shaft is rotating and the throttle setting is greater than zero.

18. The system of claim 10 wherein, the system further comprises a battery charge sensor that sends a signal to the control unit in response to the level of charge of the battery and a brake activation sensor for producing a signal when a brake is activated, and, wherein the control unit is further adapted to engage the motor-generator drive shaft clutch in response to the battery charge signal and the brake activation signal if the brake activation signal indicates that the brake is activated and if the battery charge signal indicates that the level of charge of the battery is below a predetermined level so that power transfers from the vehicle drive shaft into the motor-generator to provide regenerative braking as the charging battery places an electrical load on the motor-generator.

* * * * *